(12) United States Patent
Liu

(10) Patent No.: US 12,326,653 B2
(45) Date of Patent: Jun. 10, 2025

(54) RAPID TELESCOPING SUPPORT POLE

(71) Applicant: Coman Photo Equipment (Zhongshan) Co., Ltd., Zhongshan (CN)

(72) Inventor: Yao Liu, Zhuhai (CN)

(73) Assignee: Coman Photo Equipment (Zhongshan) Co., Ltd., Zhongshan (CN)

( * ) Notice: Subject to any disclaimer, the term of this patent is extended or adjusted under 35 U.S.C. 154(b) by 249 days.

(21) Appl. No.: 18/309,041

(22) Filed: Apr. 28, 2023

(65) Prior Publication Data

US 2024/0094608 A1    Mar. 21, 2024

(30) Foreign Application Priority Data

Sep. 18, 2022  (CN) .................. 202222587094.X

(51) Int. Cl.
| | | |
|---|---|---|
| G03B 17/56 | (2021.01) | |
| A45B 3/00 | (2006.01) | |
| F16M 11/26 | (2006.01) | |
| A45B 9/00 | (2006.01) | |

(52) U.S. Cl.
CPC .............. G03B 17/561 (2013.01); A45B 3/00 (2013.01); F16M 11/26 (2013.01); *A45B 2009/007* (2013.01)

(58) Field of Classification Search
None
See application file for complete search history.

(56) References Cited

U.S. PATENT DOCUMENTS

2020/0149679 A1 *  5/2020  Grabner ................. F16M 11/16

FOREIGN PATENT DOCUMENTS

| CN | 113090903 A * | 7/2021 | ............ F16B 7/1463 |
| EP | 4443039 A1 * | 10/2024 | ............ F16B 7/1463 |

* cited by examiner

*Primary Examiner* — Rodney E Fuller
(74) *Attorney, Agent, or Firm* — Wang Law Firm, Inc.

(57) ABSTRACT

A rapid telescoping support pole, a photographic equipment, and a hiking pole having an operation driving member, a transverse driving wheel, and a vertical transmission wheel cooperating with said transverse driving wheel; the vertical transmission wheel driving multi-section inner tubes cooperatively to make the multi-stage outer tube conversion between a telescopic unlocked state and a telescopic locked state so as to achieve the rapid telescoping purpose. It has the advantages of rapid telescoping, extremely convenient use and movement, and simultaneous operation of upper and lower telescopic poles in one cooperating movement, therefore it has superior performance in terms of technology, practicality and economy.

6 Claims, 6 Drawing Sheets

RAPID TELESCOPING SUPPORT POLE

FIELD OF INVENTION

The present invention relates to a rapid telescoping support pole, photographic equipment, and a hiking pole.

BACKGROUND OF THE INVENTION

According to patent search and market survey, the adjustment of the existing photographic equipment and hiking pole, it has to adjust the sections one by one to complete the telescoping adjustment, such as in the use of a tripod pole of photographic equipment, the operation of telescoping adjustment is quite inconvenient, where its three poles need nine times of adjustment, thus missing many timings for shotting, based on this reason, we developed a rapid telescoping support pole.

SUMMARY OF THE INVENTION

The technical problem to be solved by the purpose of the present invention is to provide a rapid telescoping support pole having the advantages of rapid telescoping adjustment, extremely convenient use and movement, and simultaneous operation of upper and lower telescopic poles in one cooperating movement.

In order to accomplish the above purpose, the technical solution employed in the present invention is to provide a rapid telescoping support pole comprising an operation driving member, a transverse driving wheel, and a vertical transmission wheel cooperating with the transverse driving wheel; the vertical transmission wheel driving multi-section inner tubes cooperatively to make the multi-stage outer tube conversion between a telescopic unlocked state and a telescopic locked state so as to achieve the rapid telescoping purpose.

In one or more embodiments of the present invention, the multi-section inner tube includes a first inner tube, a second inner tube, and a third inner tube, each of which is provided with a twist-limiting chamber that moves cooperatively with the first inner tube, the second inner tube, and the third inner tube to become a telescopic locking structure that drives the outer tube to rotate.

In one or more embodiments of the present invention, the telescopic locking structure comprises a telescopic guide strip provided on the inner wall of the outer tube and an inner sleeve that fits the telescopic guide strip, and the inner sleeve being provided with a guide slot, wherein the telescopic guide strip enters the guide slot to form a movable state.

In one or more embodiments of the present invention, the shaft neck of the transverse driving wheel has an extended polygonal portion, and the operation driving member has a polygonal hole corresponding to the shaft neck.

In one or more embodiments of the present invention, the transverse driving wheel is disposed in a side slot of a pole head member; the vertical transmission wheel is disposed in a receiving chamber of the pole head member; and the transverse driving wheel is engaged with the vertical transmission wheel.

In one or more embodiments of the present invention, the vertical transmission wheel is provided with a through-hole, and the vertical transmission wheel is connected to the first inner tube by means of a sleeve, and the sleeve is provided with a screw hole; a bolt can be connected to the screw hole through the through-hole.

In one or more embodiments of the present invention, the multi-stage outer tube includes a first outer tube, a second outer tube, and a third outer tube; a first telescopic restriction sleeve is provided between the first outer tube and the second outer tube, and a second telescopic restriction sleeve is provided between the second outer tube and the third outer tube; the first telescopic restriction sleeve is provided with a restriction projection, and a hole is provided on the first outer tube corresponding to the restriction projection.

In one or more embodiments of the present invention, the third inner tube is connected to an end sleeve and the end sleeve is connected to the third outer tube.

According to the same concept, the present invention also provides a photographic equipment which includes the above-mentioned scheme of the rapid telescoping support pole.

According to the same concept, the present invention also provides a hiking pole, which includes the above-mentioned scheme of rapid telescoping support pole.

Compared to the prior art described in the Background of the Invention, the practical effect of the present invention is as follows: by using the above-mentioned technical solutions, it has the advantages of rapid telescoping adjustment, extremely convenient use and movement, and simultaneous operation of upper and lower telescopic poles in one cooperating movement, therefore it has superior performance in technology, practicality and economy.

DETAILED DESCRIPTION OF THE PREFERRED EMBODIMENTS

Figure 1:
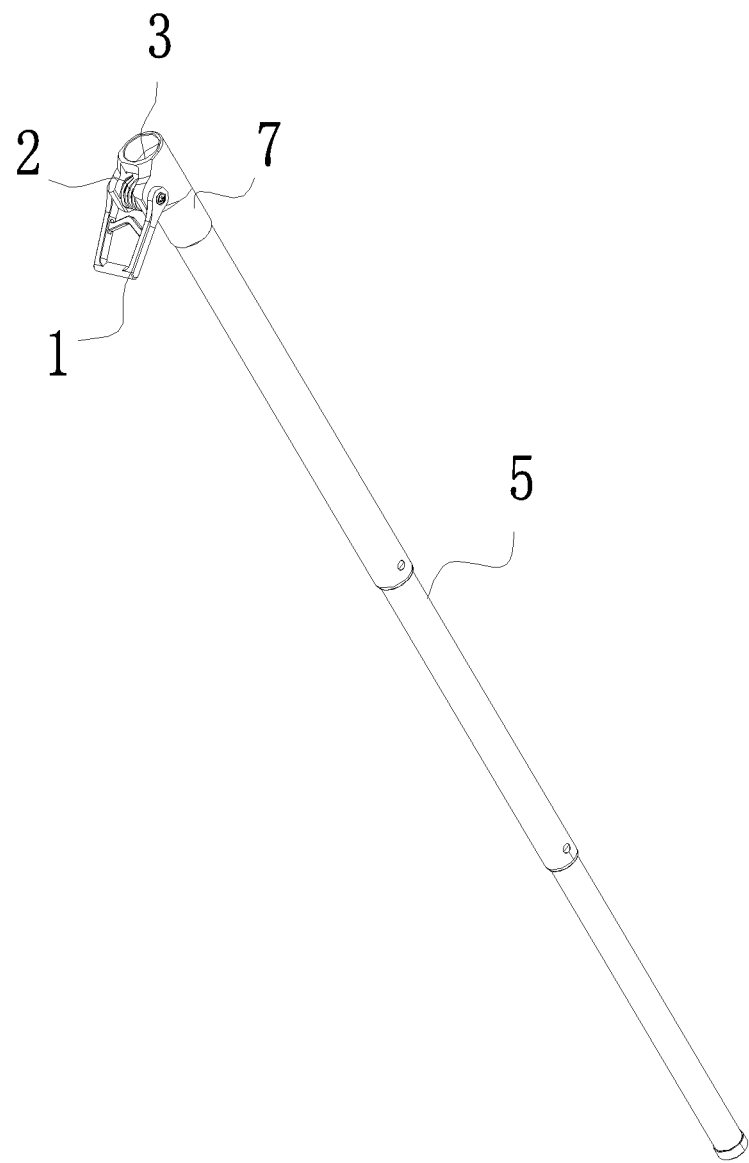
FIG. 1 is a schematic view of the structure of the rapid telescoping support pole in one embodiment of the present invention.

Embodiments of the present invention are described in detail below, and examples of the embodiments are shown in the accompanying drawings, wherein the same or similar reference numbers from beginning to end indicate the same or similar components or components having the same or similar functions.

The orientation shown in the accompanying drawings is not to be construed as limiting the specific scope of protection of the present invention and is for reference purposes only to understand the preferred embodiment, which may be varied or increased in number or simplified in structure by the product parts shown in the drawings.

The "connection" described in the specification and the "connection" relationship between the parts shown in the accompanying drawings can be understood as a fixed connection or a detachable connection or a connection that forms an integral part; it can be connected directly or through an intermediate medium, and a person having ordinary skill in the art can understand the connection relationship according to the specific situation and can arrive at a screwed or riveted or welded or clamped or embedded connection in a suitable manner for different implementations of the alternative.

Descriptions of the top, bottom, left, right, top, bottom and other orientation words and the orientation shown in the accompanying drawings, the parts can be in direct contact or through another feature between them to contact; such as in the top can be directly above and obliquely above, or it only indicates above other things; other orientation can also be understood by analogy. The following will be combined with the accompanying drawings of the specification, through the specific embodiments of the present invention for further description, so that the technical solutions of the present invention and its beneficial effects will be clearer and more explicit.

Figure 2:
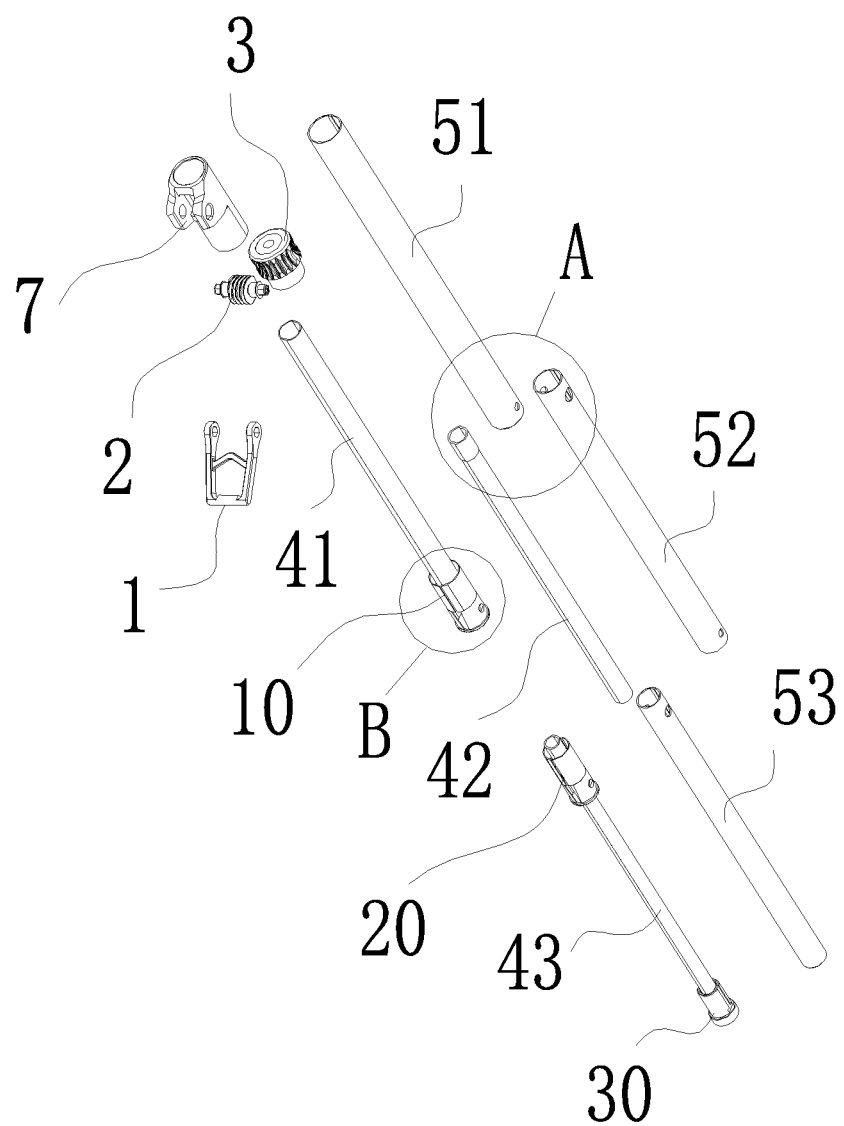
FIG. 2 is a schematic view of the exploded structure of the rapid telescoping support pole in one embodiment of the present invention.
Figure 3:
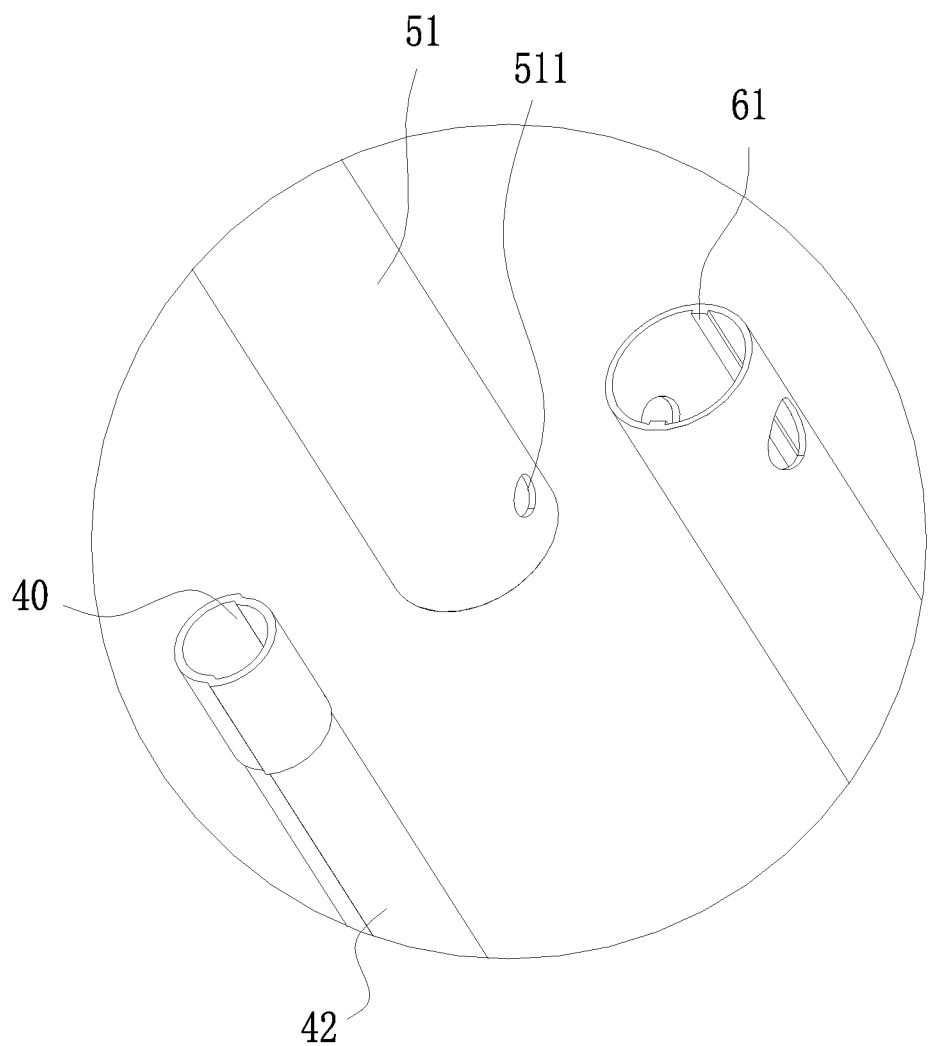
FIG. 3 is an enlarged view at A in FIG. 2.
Figure 4:
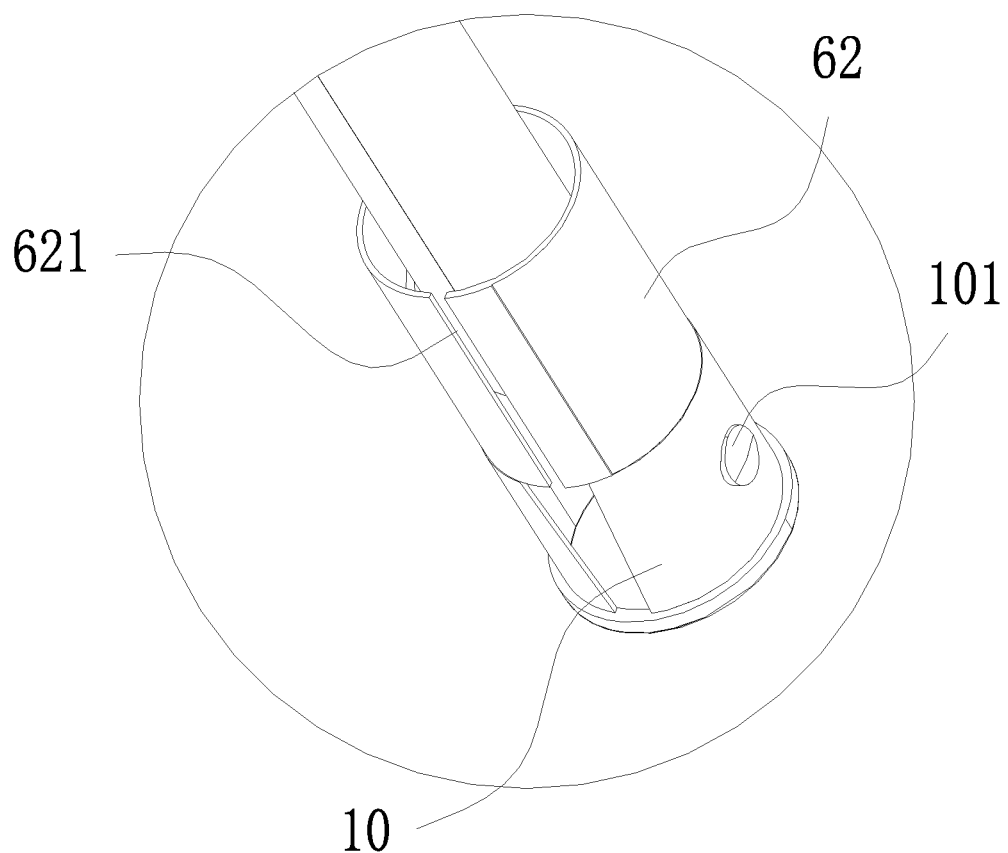
FIG. 4 is an enlarged view at B in FIG. 2.
Figure 5:
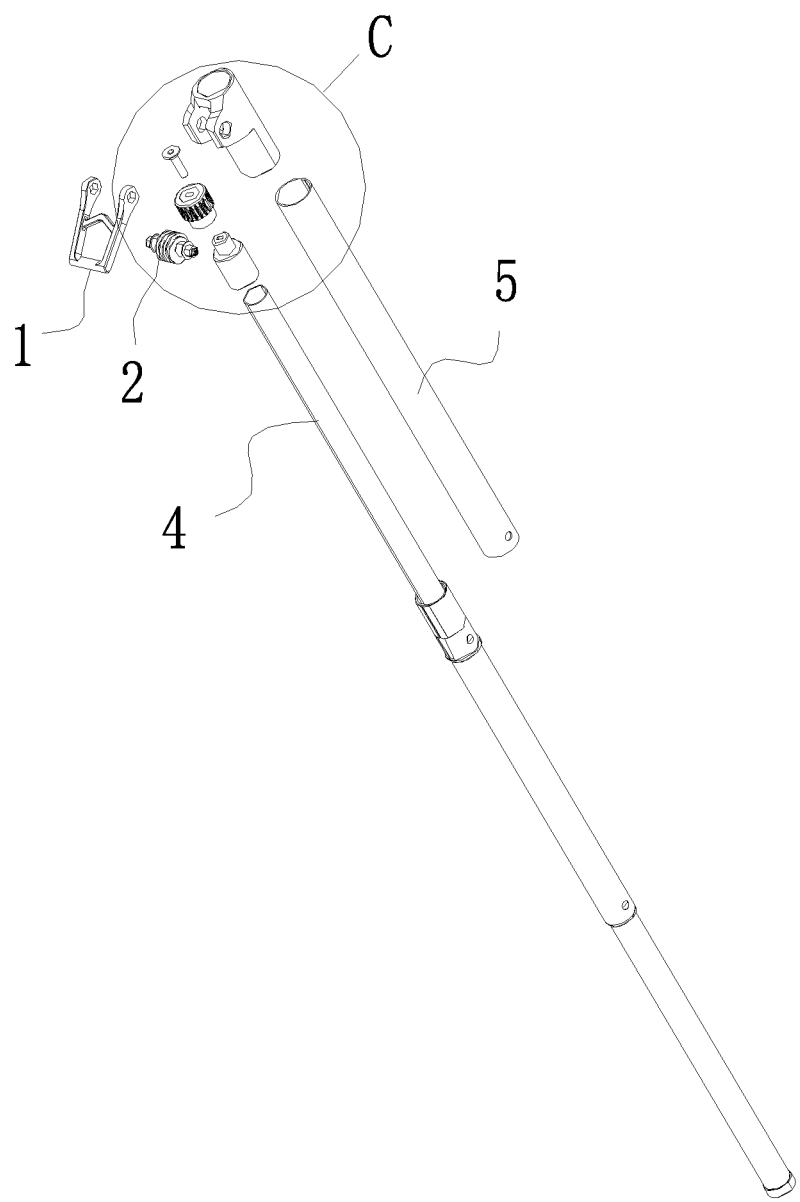
FIG. 5 is a schematic view of another exploded structure of the rapid telescoping support pole in one embodiment of the present invention.
Figure 6:
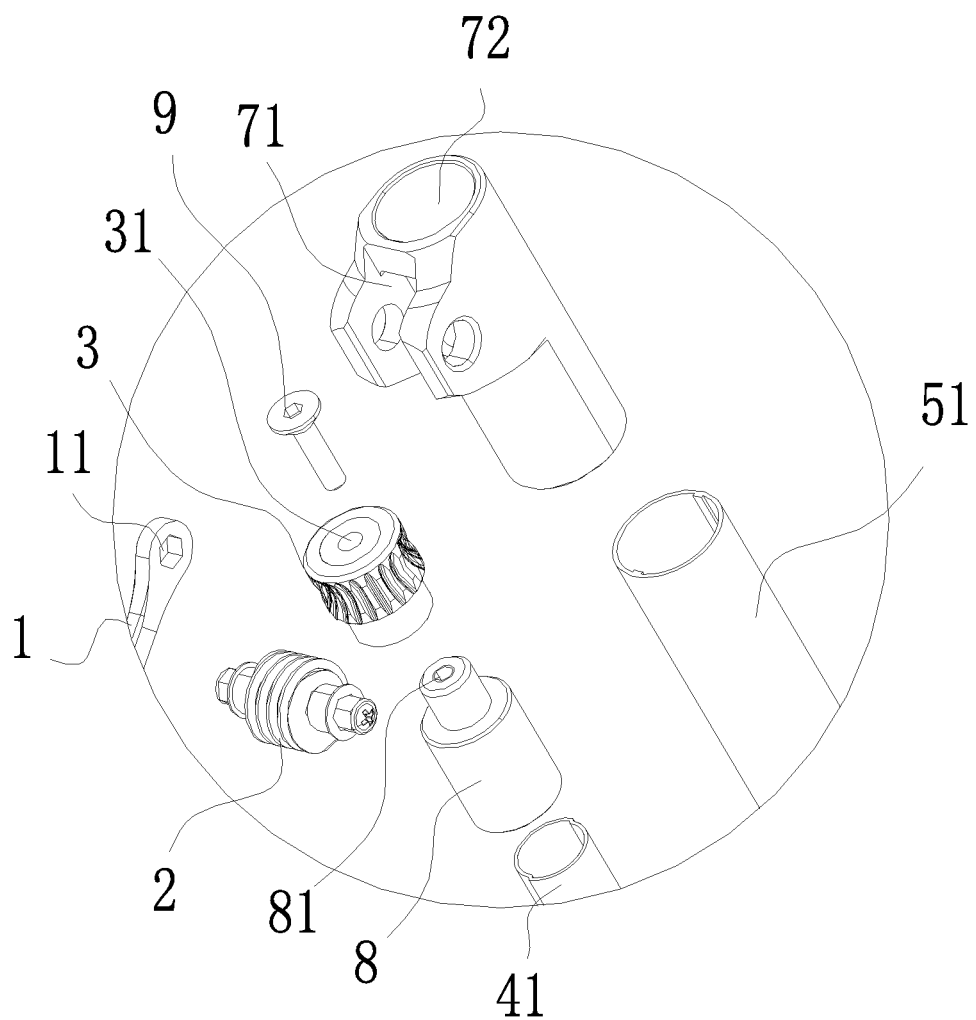
FIG. 6 is an enlarged view at C in FIG. 5; and a person skilled in the art will be able to understand and result a scheme from the shape and construction shown in the accompanying drawings. The various parts of the accompanying drawings are not necessarily to scale, and the dimensions of the various parts and components of the accompanying drawings may be enlarged or reduced to more clearly illustrate the embodiments of the present invention described herein.

Specific embodiments are described below with reference to FIGS. 1-5, but it will be readily understood by those skilled in the art that the detailed description given herein with reference to these accompanying drawings is for illustrative purposes only and should not be construed as limiting. The present embodiment provides a rapid telescoping support pole comprising an operation driving member 1, a transverse driving wheel 2, and a vertical transmission wheel 3 cooperating with the transverse driving wheel 2; the vertical transmission wheel 3 driving multi-section inner tubes 4 cooperatively to make the multi-stage outer tube 5 conversion between a telescopic unlocked state and a telescopic locked state so as to achieve the rapid telescoping purpose.

Wherein, the multi-section inner tube 4 includes a first inner tube 41, a second inner tube 42, and a third inner tube 43, each of which is provided with a twist-limiting chamber 40 that moves cooperatively with the first inner tube 41, the second inner tube 42, and the third inner tube 43 to become a telescopic locking structure 6 that drives the outer tube to rotate.

The telescopic locking structure 6 comprises a telescopic guide strip 61 provided on the inner wall of the outer tube and an inner sleeve 62 that fits the telescopic guide strip 61, and the inner sleeve 62 being provided with a guide slot 621, wherein the telescopic guide strip 61 enters the guide slot 621 to form a movable state so that the multi-stage outer tube 5 achieves the function of telescoping movement.

The shaft neck of the transverse driving wheel 2 has an extended polygonal portion 21, and the operation driving member has a polygonal hole 11 corresponding to the polygonal portion 21, and the polygon can be three, four, five, hexagonal, etc., without any specific limitation on the number.

The transverse driving wheel 2 is disposed in a side slot 71 of a pole head member 7; the vertical transmission wheel 3 is disposed in a receiving chamber 72 of the pole head member 7; and the transverse driving wheel is engaged with the vertical transmission wheel. The vertical transmission wheel 3 is provided with a through-hole 31, and the vertical transmission wheel 3 is connected to the first inner tube 41 by means of a sleeve 8, and the sleeve 8 is provided with a screw hole 81; a bolt 9 can be connected to the screw hole 81 through the through-hole.

The multi-stage outer tube 5 includes a first outer tube 51, a second outer tube 52, and a third outer tube 53; a first telescopic restriction sleeve 10 is provided between the first outer tube 51 and the second outer tube 52, and a second telescopic restriction sleeve 20 is provided between the second outer tube 52 and the third outer tube 53.

The first telescopic restriction sleeve 10 is provided with a restriction projection 101, and a hole 511 is provided on the first outer tube 51 corresponding to the restriction projection 101. The third inner tube 43 is connected to an end sleeve 30 and the end sleeve 30 is connected to the third outer tube 53.

In use, by swinging the operation driving member 1, the transverse driving wheel 2 is driven to rotate. Since the vertical transmission wheel 3 is engaged with the transverse driving wheel 2 and converts the transmission direction, the multi-section inner tube 4 rotates synchronously so that the telescopic locking structure 6 moves cooperatively with the multi-stage outer tube 5, and the telescopic locking structure 6 makes the telescopic guide strip 61 enter the guide slot 621 to form a movable state, thereby achieving a multi-stage simultaneous operation; which can accomplish a rapid telescopic adjustment, extremely convenient use and movement, simultaneous operation of upper and lower telescopic poles in one cooperating movement, and other advantages.

Combined with the above embodiments, as first of the specific implementation applications of the present invention, to provide a photographic equipment, which includes the above-mentioned scheme of the rapid telescoping support pole.

Combined with the above embodiments, as second of the specific implementation applications of the present invention, to provides a hiking pole, which includes the above-mentioned scheme of rapid telescoping support pole.

For purposes of illustration, the foregoing description uses specific nomenclature to provide a thorough understanding of the embodiments. However, it will be obvious to those skilled in the art that specific details are not required in order to practice the embodiments. Those skilled in the art should understand that while the present invention is not limited to the specific embodiments described above, improvements and substitutions based on the present invention using techniques well known in the art fall within the scope of protection of the present invention and should be limited by the respective claims.

What is claimed is:

1. A rapid telescoping support pole comprising:
   an operation driving member,
   a transverse driving wheel,
   a vertical transmission wheel cooperating with the transverse driving wheel, and
   a multi-section inner tube having a first inner tube, a second inner tube, and a third inner tube, each of which has a twist-limiting chamber that cooperatively moves with the three aforementioned inner tubes to form a telescopic locking structure that drives a multi-stage outer tube to rotate;
   the telescopic locking structure comprises a telescopic guide strip provided on an inner wall of the outer tube and an inner sleeve that fits the telescopic guide strip, and the inner sleeve being provided with a guide slot, wherein the telescopic guide strip enters the guide slot to form a movable state;
   the vertical transmission wheel cooperatively drives the multi-section inner tube to convert the multi-stage outer tube between a telescopic unlocked state and a telescopic locked state.

2. The rapid telescoping support pole according to claim 1, wherein: the transverse driving wheel has a shaft neck with extended polygonal portion, and the operation driving member has a polygonal hole corresponding to the shaft neck.

3. The rapid telescoping support pole according to claim 2, wherein: the transverse driving wheel is disposed in a side slot of a pole head member; the vertical transmission wheel is disposed in a receiving chamber of the pole head member; and the transverse driving wheel is engaged with the vertical transmission wheel.

4. The rapid telescoping support pole according to claim 2, wherein: the vertical transmission wheel is provided with a through-hole, the vertical transmission wheel is connected to the first inner tube by means of a sleeve, and the sleeve is provided with a screw hole; a bolt is connected to the screw hole through the through-hole.

5. The rapid telescoping support pole according to claim 4, wherein: the multi-stage outer tube includes a first outer tube, a second outer tube, and a third outer tube; a first telescopic restriction sleeve is provided between the first outer tube and the second outer tube, and a second telescopic restriction sleeve is provided between the second outer tube and the third outer tube;

the first telescopic restriction sleeve is provided with a restriction projection, and a hole is provided on the first outer tube corresponding to the restriction projection.

6. The rapid telescoping support pole according to claim 4, wherein: the third inner tube is connected to an end sleeve and the end sleeve is connected to the third outer tube.

\* \* \* \* \*